United States Patent
Gu et al.

(10) Patent No.: US 9,426,459 B2
(45) Date of Patent: Aug. 23, 2016

(54) MANAGING MULTI-REFERENCE PICTURE BUFFERS AND IDENTIFIERS TO FACILITATE VIDEO DATA CODING

(71) Applicant: Google Inc., Mountain View, CA (US)

(72) Inventors: Qunshan Gu, Hayward, CA (US); Marco Paniconi, Campbell, CA (US)

(73) Assignee: GOOGLE INC., Mountain View, CA (US)

( * ) Notice: Subject to any disclaimer, the term of this patent is extended or adjusted under 35 U.S.C. 154(b) by 347 days.

(21) Appl. No.: 13/865,242

(22) Filed: Apr. 18, 2013

(65) Prior Publication Data

US 2013/0279589 A1   Oct. 24, 2013

Related U.S. Application Data

(60) Provisional application No. 61/636,944, filed on Apr. 23, 2012.

(51) Int. Cl.
| | | |
|---|---|---|
| *H04N 19/00* | (2014.01) | |
| *H04N 21/234* | (2011.01) | |
| *H04N 21/44* | (2011.01) | |
| *H04N 21/845* | (2011.01) | |

(52) U.S. Cl.
CPC ............. *H04N 19/00* (2013.01); *H04N 21/234* (2013.01); *H04N 21/23406* (2013.01); *H04N 21/44004* (2013.01); *H04N 21/8451* (2013.01)

(58) Field of Classification Search
USPC ........................................ 375/240.01–240.29
See application file for complete search history.

(56) References Cited

U.S. PATENT DOCUMENTS

| | | | |
|---|---|---|---|
| 4,816,906 A | 3/1989 | Kummerfeldt et al. | |
| 4,924,310 A | 5/1990 | von Brandt | |
| 5,148,269 A | 9/1992 | de Haan et al. | |
| 5,337,086 A | 8/1994 | Fujinami | |

(Continued)

FOREIGN PATENT DOCUMENTS

| | | |
|---|---|---|
| EP | 0634873 | 1/1995 |
| EP | 1351510 | 10/2003 |

(Continued)

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

(Continued)

*Primary Examiner* — Leron Beck
(74) *Attorney, Agent, or Firm* — Young Basile Hanlon & MacFarlane, P.C.

(57) ABSTRACT

Encoding and decoding is accomplished herein using a multi-reference picture buffer. Reference frames are assigned to reference picture buffers when used for encoding and are identified with picture IDs unique relative to other picture IDs currently associated with the reference picture buffers. The maximum picture number used as the picture ID can be based on a number of reference picture buffers available to encode and decode the frames plus a value based on an expected error rate. The picture IDs can be assigned based on a least recently used policy. When a reference frame is no longer needed for encoding and decoding, a picture ID number associated with the reference frame can be released for re-assignment to a new reference frame.

19 Claims, 7 Drawing Sheets

(56) References Cited

U.S. PATENT DOCUMENTS

| | | | |
|---|---|---|---|
| 5,371,841 A | 12/1994 | Jones | |
| 5,389,068 A | 2/1995 | Keck | |
| 5,398,068 A | 3/1995 | Liu et al. | |
| 5,442,458 A | 8/1995 | Rabbani et al. | |
| 5,461,423 A | 10/1995 | Tsukagoshi | |
| 5,483,287 A | 1/1996 | Siracusa | |
| 5,485,279 A | 1/1996 | Yonemitsu et al. | |
| 5,512,952 A | 4/1996 | Iwamura | |
| 5,568,200 A | 10/1996 | Pearlstein et al. | |
| 5,576,767 A | 11/1996 | Lee et al. | |
| 5,586,285 A | 12/1996 | Hasbun et al. | |
| 5,686,962 A | 11/1997 | Chung et al. | |
| 5,717,394 A | 2/1998 | Schwartz et al. | |
| 5,731,840 A | 3/1998 | Kikuchi et al. | |
| 5,748,789 A | 5/1998 | Lee et al. | |
| 5,767,909 A | 6/1998 | Jung | |
| 5,818,536 A | 10/1998 | Morris et al. | |
| 5,886,742 A | 3/1999 | Hibi et al. | |
| 5,926,226 A | 7/1999 | Proctor et al. | |
| 5,991,447 A | 11/1999 | Eifrig et al. | |
| 5,999,641 A | 12/1999 | Miller et al. | |
| 6,005,980 A | 12/1999 | Eifrig et al. | |
| 6,075,875 A | 6/2000 | Gu | |
| 6,084,912 A | 7/2000 | Reitmeier et al. | |
| 6,108,383 A | 8/2000 | Miller et al. | |
| 6,115,076 A | 9/2000 | Linzer | |
| 6,181,822 B1 | 1/2001 | Miller et al. | |
| 6,222,174 B1 | 4/2001 | Tullis et al. | |
| 6,236,682 B1 | 5/2001 | Ota et al. | |
| 6,272,179 B1 | 8/2001 | Kadono | |
| 6,289,049 B1 | 9/2001 | Kim et al. | |
| 6,292,837 B1 | 9/2001 | Miller et al. | |
| 6,327,304 B1 | 12/2001 | Miller et al. | |
| 6,359,929 B1 | 3/2002 | Boon | |
| 6,370,267 B1 | 4/2002 | Miller et al. | |
| 6,381,277 B1 | 4/2002 | Chun et al. | |
| 6,473,463 B2 | 10/2002 | Agarwal | |
| 6,560,366 B1 | 5/2003 | Wilkins | |
| 6,658,618 B1 | 12/2003 | Gu et al. | |
| 6,661,842 B1 | 12/2003 | Abousleman | |
| 6,711,211 B1 | 3/2004 | Lainema | |
| 6,735,249 B1 | 5/2004 | Karczewicz et al. | |
| 6,774,924 B2 | 8/2004 | Kato et al. | |
| 6,774,929 B1 | 8/2004 | Kopp | |
| 6,909,749 B2 | 6/2005 | Yang et al. | |
| 6,985,527 B2 | 1/2006 | Gunter et al. | |
| 7,027,654 B1 | 4/2006 | Ameres et al. | |
| 7,050,503 B2 | 5/2006 | Prakash et al. | |
| 7,085,319 B2 | 8/2006 | Prakash et al. | |
| 7,221,710 B2 | 5/2007 | Lee | |
| 7,253,831 B2 | 8/2007 | Gu | |
| 7,406,053 B2 | 7/2008 | Cheung et al. | |
| 7,430,261 B2* | 9/2008 | Forest | H03M 13/43 370/392 |
| 7,499,492 B1 | 3/2009 | Ameres et al. | |
| 7,529,199 B1 | 5/2009 | Wijnands et al. | |
| 7,532,808 B2 | 5/2009 | Lainema | |
| 7,606,310 B1 | 10/2009 | Ameres et al. | |
| 7,671,894 B2 | 3/2010 | Yea et al. | |
| 7,734,821 B2 | 6/2010 | Wang et al. | |
| 7,773,677 B2 | 8/2010 | Lee | |
| 7,974,233 B2 | 7/2011 | Banerjee | |
| 8,005,137 B2 | 8/2011 | Han et al. | |
| 8,111,752 B2 | 2/2012 | Kumar et al. | |
| 8,284,846 B2 | 10/2012 | Lamy-Bergot et al. | |
| 8,310,521 B2 | 11/2012 | Zhang et al. | |
| 8,638,854 B1 | 1/2014 | Bankoski et al. | |
| 9,014,266 B1* | 4/2015 | Gu | H04N 19/159 375/240.13 |
| 2001/0022815 A1 | 9/2001 | Agarwal | |
| 2002/0031272 A1 | 3/2002 | Bagni et al. | |
| 2002/0036705 A1 | 3/2002 | Lee et al. | |
| 2002/0071485 A1 | 6/2002 | Caglar et al. | |
| 2002/0118295 A1 | 8/2002 | Karczewicz et al. | |
| 2002/0172289 A1 | 11/2002 | Akiyoshi et al. | |
| 2003/0081850 A1 | 5/2003 | Karczewicz et al. | |
| 2003/0123545 A1 | 7/2003 | Prakash et al. | |
| 2003/0165331 A1 | 9/2003 | Van Der Schaar | |
| 2003/0202594 A1 | 10/2003 | Lainema | |
| 2003/0215014 A1 | 11/2003 | Koto et al. | |
| 2004/0013308 A1 | 1/2004 | Jeon et al. | |
| 2004/0037357 A1 | 2/2004 | Bagni et al. | |
| 2004/0042549 A1 | 3/2004 | Huang et al. | |
| 2004/0080669 A1 | 4/2004 | Nagai et al. | |
| 2004/0184533 A1 | 9/2004 | Wang | |
| 2004/0202252 A1 | 10/2004 | Lee | |
| 2004/0228410 A1 | 11/2004 | Ameres et al. | |
| 2005/0008240 A1 | 1/2005 | Banerji et al. | |
| 2005/0031030 A1* | 2/2005 | Kadono | G11B 27/105 375/240.01 |
| 2005/0123056 A1 | 6/2005 | Wang et al. | |
| 2005/0147167 A1 | 7/2005 | Dumitras et al. | |
| 2005/0185045 A1 | 8/2005 | Kamariotis | |
| 2005/0207490 A1* | 9/2005 | Wang | H04N 19/573 375/240.15 |
| 2005/0259736 A1 | 11/2005 | Payson | |
| 2005/0286629 A1 | 12/2005 | Dumitras et al. | |
| 2006/0050149 A1* | 3/2006 | Lang | B60R 1/00 348/148 |
| 2006/0050695 A1 | 3/2006 | Wang | |
| 2006/0062481 A1 | 3/2006 | Suvanto | |
| 2006/0083300 A1 | 4/2006 | Han et al. | |
| 2006/0159174 A1 | 7/2006 | Chono | |
| 2006/0285598 A1 | 12/2006 | Tulkki | |
| 2007/0009034 A1 | 1/2007 | Tulkki | |
| 2007/0019730 A1 | 1/2007 | Lee et al. | |
| 2007/0092010 A1 | 4/2007 | Huang et al. | |
| 2007/0109409 A1 | 5/2007 | Yea et al. | |
| 2007/0130755 A1 | 6/2007 | Duquette et al. | |
| 2007/0199011 A1 | 8/2007 | Zhang et al. | |
| 2007/0206673 A1 | 9/2007 | Cipolli et al. | |
| 2007/0211798 A1 | 9/2007 | Boyce et al. | |
| 2007/0230563 A1 | 10/2007 | Tian et al. | |
| 2008/0112486 A1 | 5/2008 | Takahashi et al. | |
| 2008/0115185 A1 | 5/2008 | Qiu et al. | |
| 2008/0130755 A1 | 6/2008 | Loukas et al. | |
| 2008/0219351 A1 | 9/2008 | Kim et al. | |
| 2008/0273599 A1 | 11/2008 | Park et al. | |
| 2008/0317138 A1* | 12/2008 | Jia | H04N 19/44 375/240.28 |
| 2009/0103610 A1* | 4/2009 | Puri | H04N 19/159 375/240.03 |
| 2009/0122859 A1 | 5/2009 | Yasuda | |
| 2009/0147856 A1 | 6/2009 | Song et al. | |
| 2009/0148058 A1 | 6/2009 | Dane et al. | |
| 2009/0154563 A1 | 6/2009 | Hong et al. | |
| 2009/0175330 A1 | 7/2009 | Chen et al. | |
| 2009/0238269 A1* | 9/2009 | Pandit | H04N 19/597 375/240.12 |
| 2009/0238277 A1 | 9/2009 | Meehan | |
| 2010/0061444 A1 | 3/2010 | Wilkins et al. | |
| 2010/0061461 A1 | 3/2010 | Bankoski et al. | |
| 2010/0061645 A1 | 3/2010 | Wilkins et al. | |
| 2010/0086027 A1 | 4/2010 | Panchal et al. | |
| 2010/0104016 A1 | 4/2010 | Aoki | |
| 2010/0195721 A1* | 8/2010 | Wu | H04N 19/159 375/240.12 |
| 2010/0239015 A1 | 9/2010 | Wang et al. | |
| 2011/0090960 A1 | 4/2011 | Leontaris et al. | |
| 2011/0164684 A1* | 7/2011 | Sato | H04N 19/56 375/240.16 |
| 2012/0063513 A1 | 3/2012 | Grange et al. | |
| 2012/0092452 A1 | 4/2012 | Tourapis et al. | |
| 2012/0189058 A1 | 7/2012 | Chen et al. | |
| 2012/0257677 A1 | 10/2012 | Bankoski et al. | |
| 2012/0328005 A1 | 12/2012 | Yu et al. | |
| 2013/0022099 A1 | 1/2013 | Liu et al. | |
| 2013/0044817 A1 | 2/2013 | Bankoski et al. | |
| 2013/0279589 A1* | 10/2013 | Gu | H04N 21/234 375/240.16 |

(56) References Cited

U.S. PATENT DOCUMENTS

2014/0169449 A1* 6/2014 Samuelsson ..... H04N 19/00024
375/240.02

FOREIGN PATENT DOCUMENTS

| EP | 1496706 | 1/2005 |
|----|---------|--------|
| GB | 2403618 | 1/2005 |
| JP | 8280032 | 10/1996 |
| JP | 11262018 | 9/1999 |
| JP | 11289544 | 10/1999 |
| JP | 11313332 | 11/1999 |
| JP | 11513205 | 11/1999 |
| KR | 100213018 | 8/1999 |
| KR | 20010030916 | 4/2001 |
| WO | WO0150770 | 7/2001 |
| WO | WO03026315 | 3/2003 |
| WO | WO03084235 | 10/2003 |
| WO | WO2006078115 | 7/2006 |
| WO | WO2008008331 | 1/2008 |
| WO | WO2011005624 | 1/2011 |
| WO | WO2012102973 | 8/2012 |

OTHER PUBLICATIONS

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Bankoski et al. "VP8 Data Format and Decoding Guide; draft-bankoski-vp8-bitstream-02" Network Working Group. Dated May 18, 2011.

Bankoski et al. "Technical Overview of VP8, an Open Source Video Codec for the Web". Dated Jul. 11, 2011.

Bankoski, J., Koleszar, J., Quillio, L., Salonen, J., Wilkins, P., and Y. Xu, "VP8 Data Format and Decoding Guide", RFC 6386, Nov. 2011.

Mozilla, "Introduction to Video Coding Part 1: Transform Coding", Video Compression Overview, Mar. 2012, 171 pp.

High efficiency video coding (HEVC) text specification draft 6, JCTVC-H1003, JCT-VC 7th meeting, Geneva, Switzerland, Nov. 21-30, 2011.

Athanasios, et al.,"Weighted prediction methods for improved motion compensation," Image Processing (ICIP), 2009 16th IEEE International Conference, Nov. 7, 2009, pp. 1029-1032.

Chen, Michael C., et al.; "Design and Optimization of a Differentially Coded Variable Block Size Motion Compensation System", IEEE 1996, 4 pp.

Chen, Xing C., et al.; "Quadtree Based Adaptive Lossy Coding of Motion Vectors", IEEE 1996, 4 pp.

Chong Soon Lim et al. Reference Lists for B Pictures Under Low Delay Constraints, 95. MPEG Meeting; Jan. 24, 2011; Jan. 21, 2011.

Ebrahimi, Touradj, et al.; "Joint motion estimation and segmentation for very low bitrate video coding", SPIE vol. 2501, 1995, 12 pp.

EP127356814 Search Report mailed Oct. 30, 2014.

Fang S et al.: "The Construction of Combined List for HEVC",6. JCT-VC Meeting; 97. MPEG Meeting; Jul. 14, 2011-Jul. 22, 2011;Torino;(Joint Collaborative Team on Video Coding of ISO/IEC JTC1/SC29/WG11 and ITU-T SG.16); URL:http://wftp3.itu.int/av-arch/jctvc-site/, No. JCTVC-F573. Jul. 16, 2011.

Guillotel, Philippe, et al.; "Comparison of motion vector coding techniques", SPIE vol. 2308, 1994, 11 pp.

IPRP for PCT/US2013/037058 from related application mailed Nov. 6, 2014.

ISR & Written Opinion, RE: Application # PCT/US2012/043748;Sep. 14, 2012.

ISR and Written Opinion for International Patent Application PCT/US2012/031579; dated Jun. 21, 2012.

Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.

Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.

Liu, Bede, et al.; "A simple method to segment motion field for video coding", SPIE vol. 1818, Visual Communications and Image Processing 1992, 10 pp.

Liu, Bede, et al.; "New Fast Algorithms for the Estimation of Block Motion Vectors", IEEE Transactions on Circuits and Systems for Video Technology, vol. 3, No. 2, Apr. 1993, 10 pp.

Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.

Martin, Graham R., et al.; "Reduced Entropy Motion Compensation Using Variable Sized Blocks", SPIE vol. 3024, 1997, 10 pp.

Nicolas, H., et al.; "Region-based motion estimation using deterministic relaxation schemes for image sequence coding", IEEE 1992, 4 pp.

Nokia, Inc., Nokia Research Center, "MVC Decoder Description", Telecommunication Standardization Sector, Study Period 1997-2000, Geneva, Feb. 7, 2000, 99 pp.

ON2 Technologies Inc., White Paper TrueMotion VP7 Video Codec, Jan. 10, 2005, 13 pages, Document Version: 1.0, Clifton Park, New York.

Orchard, Michael T.; "Exploiting Scene Structure in Video Coding", IEEE 1991, 5 pp.

Orchard, Michael T.; "Predictive Motion-Field Segmentation for Image Sequence Coding", IEEE Transactions on Circuits and Systems for Video Technology, vol. 3, No. 1, Feb. 1993, 17 pp.

Schiller, H., et al.; "Efficient Coding of Side Information in a Low Bitrate Hybrid Image Coder", Signal Processing 19 (1990) Elsevier Science Publishers B.V. 61-73, 13 pp.

Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.

(56) References Cited

OTHER PUBLICATIONS

Steliaros, Michael K., et al.; "Locally-accurate motion estimation for object-based video coding", SPIE vol. 3309, 1997, 11 pp.

Stiller, Christoph; "Motion-Estimation for Coding of Moving Video at 8 kbits with Gibbs Modeled Vectorfield Smoothing", SPIE vol. 1360 Visual Communications and Image Processing 1990, 9 pp.

Strobach, Peter; "Tree-Structured Scene Adaptive Coder", IEEE Transactions on Communications, vol. 38, No. 4, Apr. 1990, 10 pp.

Wang et al.,On reference picture list construction for uni-predicted partitions, JCT-VC Meeting, JCTVCE348, MPEG Meeting, Geneva, Mar. 11, 2011.

Wiegand, Thomas, et al.; Long-Term Memory Motion-Compensated Prediction, date unknown.

Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.

Wright, R. Glenn, et al.; "Multimedia—Electronic Technical Manual for ATE", IEEE 1996, 3 pp.

Zhang, Kui, et al.; "Variable Block Size Video Coding With Motion Prediction and Motion Segmentation", SPIE vol. 2419, 1995, 9 pp.

Zhi Liu, Zhaoyang Zhang, Liquan Shen, Mosaic Generation in H.264 Compressed Domain, IEEE 2006.

Bo Hong: "Introduction to H.264", Internet citation, XP002952898, pp. 5, 14-15, Nov. 22, 2002.

Borman S. et al., "Super-Resolution From Image Sequences—a Review", Proceedings of Midwest Symposium on Circuits and Systems, pp. 374-378, Aug. 9, 1998.

Carreira, Joao et al. " Constrained Parametric Min-Cuts for Automatic Object Segmentation", 2010 IEEE Conference on Computer Vision and Pattern Recognition (CVPR), San Francisco, CA, Jun. 13-18, 2010.

Feng Wu et al, "Efficient Background Video Coding with Static Sprite Generation and Arbitrary-Shape Spatial Prediction Techniques", IEEE Transactions on Circuits and Systems for Video Technology, vol. 13, No. 5, pp. 394-405, May 1, 2003.

Girod B. et al., "3-D Image Models and Compression: Synthetic Hybrid or Natural Fit?", International Conference on Image Processing, vol. 2, pp. 525-529, Oct. 24, 1999.

Hendry et al., "AHG21: Explicit Reference Pictures Signaling with Output Latency Count Scheme", 7 JCT-VC Meeting; 98 MPEG Meeting Nov. 21, 2011-Nov. 30, 2011; Geneva.

Hiroshi Watanabe et al, "Sprite Coding in Object-Based Video Coding Standard: MPEG-4", Proceedings of Multiconference on Systemics, Cybernetics and Informatics, vol. 13, pp. 420-425, Jul. 1, 2001.

International Search Report dated Apr. 20, 2010 from the corresponding International Application No. PCT/US2009/056448.

Irani M et al, "Video Compression Using Mosaic Representations", Signal Processing Image Communication, vol. 7 No. 4., pp. 529-552, Nov. 1, 1995.

"Liu, P., et al, ""A fast and novel intra and inter modes decision prediction algorithm for H.264/AVC based-on the characteristics of* u macro-block"", 2009 Fifth Inti. Confr. on Intelligent Information Hiding and Multimedia Signal Processing, pp. 286-289,http:/ /i eeexplore.ieee.org/stamp/stamp.jsp?tp=&arnumber=5337483".

ON2 Technologies, Inc., White Paper On2's TrueMotion VP7 Video Codec, Jul. 11, 2008, pp. 7 pages, Document Version:1.0, Clifton Park, New York.

ON2 Technologies, Inc., White Paper On2's TrueMotion VP7 Video Codec,Jan. 10, 2005, pp. 13 pages, Document Version:1.0, Clifton Park, New York.

Park, Jun Sung, et al., "Selective Intra Prediction Mode Decision for H.264/AVC Encoders", World Academy of Science, Engineering and Technology 13, (2006).

Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.

Written Opinion of the International Searching Authority dated Aug. 8, 2010, from the corresponding International Application No. PCT/US2009/056448 filed Sep. 10, 2009.

International Search Report dated Dec. 16, 2013 from the corresponding International Application No. PCT/US2013/037058.

Sjoberg R. et al/ "Absolute signaling of refrence pictures", 6 JCT-VC Meeting; 97. MPEG Meeting; Jul. 14, 2011-Jul. 22, 2011; Torinino (Joint Collaborative Team on Video Coding of ISO/*EC JTC1/Sc29/WG11 and ITU-T SG. 16).

Shen, L., et al. Fast mode decision for multiview video coding, 2009, IEEE, entire document.

Yang, H. et al., Optimizing Motion Compensated Prediction for Error Resilient Video Coding, IEE Transactions on Image Processing, vol. 19, No. 1 Jan. 2010, entire document.

\* cited by examiner

US 9,426,459 B2

MANAGING MULTI-REFERENCE PICTURE BUFFERS AND IDENTIFIERS TO FACILITATE VIDEO DATA CODING

CROSS-REFERENCE TO RELATED APPLICATIONS

This application claims priority to U.S. Provisional Application No. 61/636,944, filed Apr. 23, 2012, which is incorporated herein in its entirety by reference. This application is related to concurrently-filed U.S. application Ser. No. 13/865,250.

TECHNICAL FIELD

This disclosure relates to multi-reference picture buffers for encoding and decoding visual data, such as video stream data, for transmission or storage.

BACKGROUND

An increasing number of applications today make use of digital video for various purposes including, for example, remote business meetings via video conferencing, high definition video entertainment, video advertisements, and sharing of user-generated videos. As technology is evolving, users have higher expectations for video quality and expect high resolution video with smooth playback.

Digital video streams typically represent video using a sequence of frames. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques. Certain of these techniques use reference frames or portions of reference frames to generate differences between the reference and the frame being encoded. The differences can generally be encoded with fewer bits than the original frame.

SUMMARY

Disclosed herein are aspects of systems, methods and apparatuses for managing multi-reference picture buffers used to encode a video stream having a plurality of frames and/or decode an encoded video stream having a plurality of frames. One encoding method includes identifying an allocated number of reference frame buffers, calculating a maximum number of picture IDs as equal to or greater than the allocated number, assigning a picture ID to a respective reference frame assigned to a respective reference frame buffer of a plurality of reference frame buffers to no higher than the maximum number of picture IDs, each picture ID having a value not assigned to any other reference frames assigned to the plurality of reference frame buffers, freeing the picture ID when its associated reference frame is no longer assigned to the reference frame buffer, periodically re-using a freed picture ID when assigning the picture IDs, encoding one or more frames of the plurality of frames using the reference frames assigned to the plurality of reference frame buffers, and including the picture ID numbers in the video stream.

One method for decoding an encoded video stream having a plurality of frames includes receiving an encoded video stream, decoding an expected error value representing possible frame errors, allocating reference picture buffers based on the expected error value, decoding a plurality of reference frames from the video stream, adding each of the plurality of reference frames to the reference picture buffers at least to a maximum value, determining an encoded video stream error value representing actual frame errors based on the decoded plurality of reference frames, and if the encoded video stream error value is greater than the decoded expected error value, signaling an error.

Variations in these and other aspects are described in additional detail below.

BRIEF DESCRIPTION OF THE DRAWINGS

The description herein makes reference to the accompanying drawings wherein like reference numerals refer to like parts throughout the several views, and wherein.

DETAILED DESCRIPTION

To permit transmission of digital video streams while limiting bandwidth consumption, video encoding and decoding schemes incorporate various compression formats. These digital video encoder/decoder formats, also called codecs, can be implemented using hardware and/or software programs executing from memory included in a computing device or devices.

Existing codecs can employ reference frames to permit video streams to maintain video quality while reducing bandwidth requirements. Reference frames can be used by an encoder to encode some frames of the video stream using a reduced number of bits to represent the residuals or differences between the blocks of the frame and blocks of the reference frame or frames. This is sometimes called interframe motion prediction. A number of reference frames can be temporarily stored or buffered in memory at the encoder or decoder during encoding or decoding. The encoder can assign numbers or symbols to the reference frame(s) to indicate which reference frame can be used to encode which frame to permit the decoder to correctly decode the frames of the video stream.

The teachings herein provide techniques for managing a multi-reference picture buffer including reference frames for encoding and decoding. The terms reference frame and reference picture are used interchangeably herein, and they may represent only a portion of a frame. Picture IDs are assigned to reference frames to permit correct encoding and decoding of frames of the video stream. A maximum number of picture IDs can be determined based on the maximum number of supported reference buffers and a margin for error resiliency. Once a reference picture is assigned a picture ID and inserted into a picture buffer, it can stay in the buffer for any period of time without conflicting with incoming pictures. The word-length requirement of the picture ID can be short depending on the number of reference pictures and the strength of packet-loss robustness. Implementations of the teachings herein can be relatively straightforward and can save overhead bits used to maintain encoder and decoder buffers in sync even under packet loss conditions. Details of certain aspects are described herein initially with reference to the environments in which they can be implemented.

Figure 1:
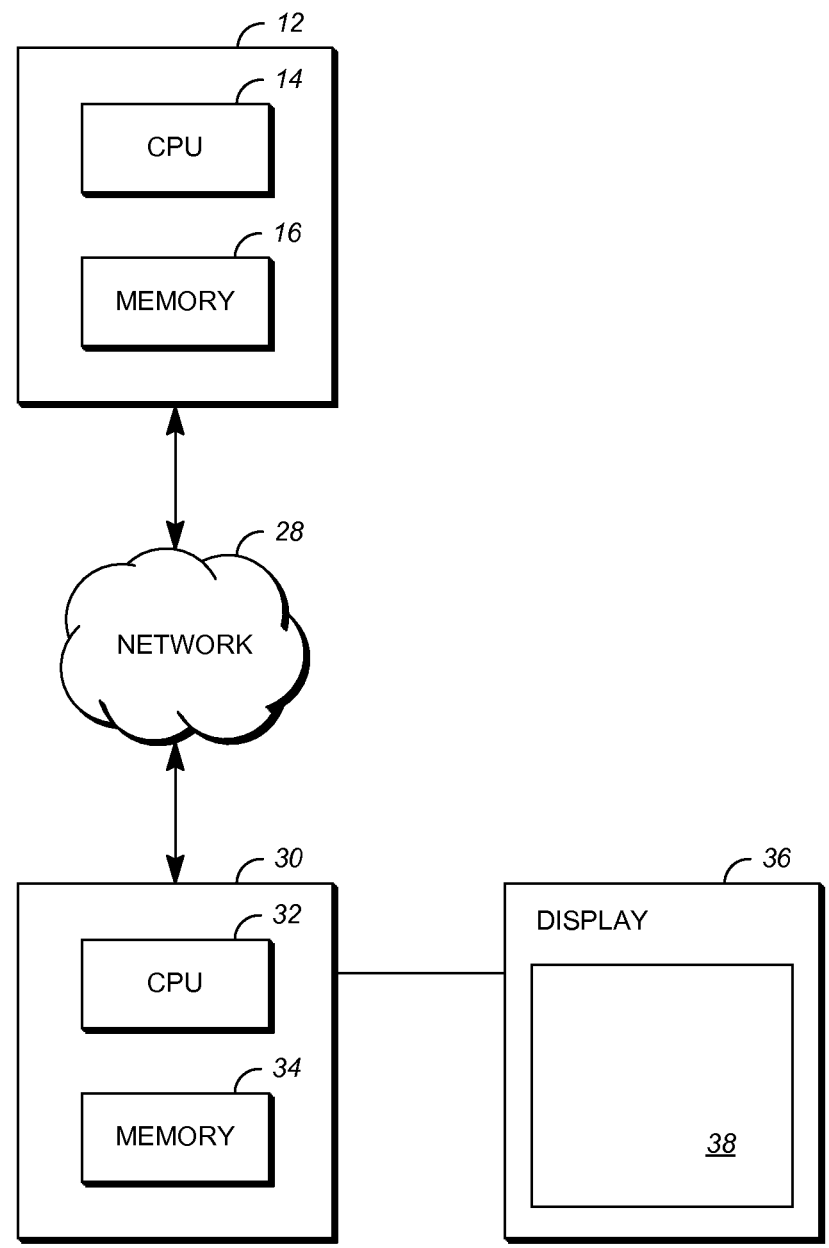
FIG. 1 is a schematic of a video encoding and decoding system.

FIG. 1 is a schematic of a video encoding and decoding system 10. An exemplary transmitting station 12 can be, for example, a computer having an internal configuration of hardware including a processor such as a central processing unit (CPU) 14 and a memory 16. CPU 14 is a controller for controlling the operations of transmitting station 12. CPU 14 is connected to memory 16 by, for example, a memory bus. Memory 16 can be read only memory (ROM), random access memory (RAM) or any other suitable memory device. Memory 16 can store data and program instructions that are used by CPU 14. Other suitable implementations of transmitting station 12 are possible. For example, the processing of transmitting station 12 can be distributed among multiple devices.

A network 28 connects transmitting station 12 and a receiving station 30 for encoding and decoding of the video stream. Specifically, the video stream can be encoded in transmitting station 12 and the encoded video stream can be decoded in receiving station 30. Network 28 can, for example, be the Internet. Network 28 can also be a local area network (LAN), wide area network (WAN), virtual private network (VPN), a cellular telephone network or any other means of transferring the video stream from transmitting station 12 to, in this example, receiving station 30.

Receiving station 30, in one example, can be a computer having an internal configuration of hardware including a processor such as a CPU 32 and a memory 34. CPU 32 is a controller for controlling the operations of receiving station 30. CPU 32 is connected to memory 34 by, for example, a memory bus. Memory 34 can be ROM, RAM or any other suitable memory device. Memory 34 can store data and program instructions that are used by CPU 32. Other suitable implementations of receiving station 30 are possible. For example, the processing of receiving station 30 can be distributed among multiple devices.

A display 36 configured to display a video stream can be connected to receiving station 30. Display 36 can be implemented in various ways, including by a liquid crystal display (LCD), a cathode-ray tube (CRT), or a light emitting diode display (LED), such as an OLED display. Display 36 is coupled to CPU 32 and can be configured to display a rendering 38 of the video stream decoded by a decoder in receiving station 30.

Other implementations of encoder and decoder system 10 are possible. In some of the implementations described, for example, an encoder is in transmitting station 12 and a decoder is in receiving station 30 as instructions in memory or a component separate from memory. However, an encoder or decoder can be coupled to a respective station 12, 30 rather than in it. Further, one implementation can omit network 28 and/or display 36. In another implementation, a video stream can be encoded and then stored for transmission at a later time to receiving station 30 or any other device having memory. In one implementation, a video stream is received by the receiving station 30 (e.g., via network 28, a computer bus, and/or some communication pathway) and stored for later decoding. In another implementation, additional components can be added to encoder and decoder system 10. For example, a display or a video camera can be attached to transmitting station 12 to capture the video stream to be encoded. In an exemplary implementation, a real-time transport protocol (RTP) is used for transmission of the encoded video. In another implementation, a transport protocol other than RTP may be used, e.g., an HTTP-based video streaming protocol.

Figure 2:
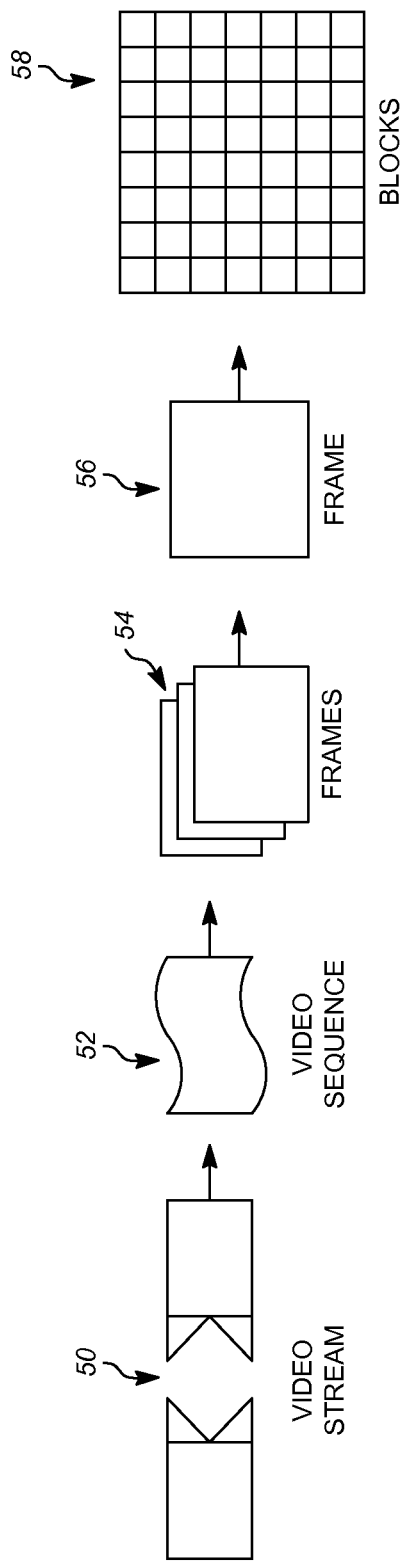
FIG. 2 is a diagram of a typical video stream to be encoded and decoded.

FIG. 2 is a diagram of a typical video stream 50 to be encoded and subsequently decoded. Video stream 50 includes a video sequence 52. At the next level, video sequence 52 includes a number of adjacent frames 54. While three frames are depicted as adjacent frames 54, video sequence 52 can include any number of adjacent frames. Adjacent frames 54 can then be further subdivided into individual frames, e.g., a single frame 56. At the next level, single frame 56 can be divided into a series of blocks 58, which can contain data corresponding to, for example, 16×16 pixels in frame 56. Each block 58 can contain luminance and chrominance data for the corresponding pixels. Blocks 58 can also be of any other suitable size such as 16×8 pixel groups or 8×16 pixel groups and can be further subdivided into smaller blocks depending on the application. Unless otherwise noted, the terms block and macroblock are used interchangeably herein.

Figure 3:
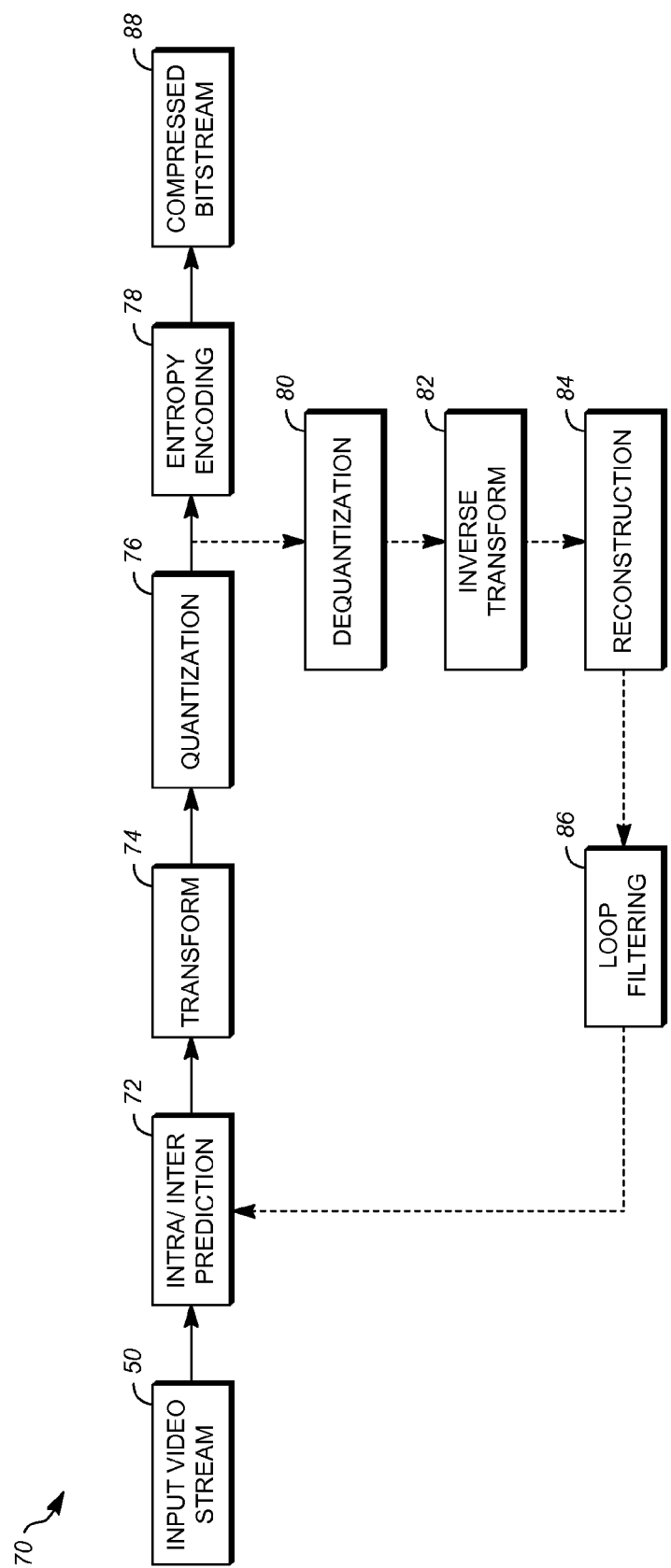
FIG. 3 is a block diagram of a video encoder in accordance with an implementation.

FIG. 3 is a block diagram of a video encoder 70 in accordance with an implementation. Encoder 70 can be implemented, as described above, in transmitting station 12 such as by providing a computer software program stored in memory 16, for example. The computer software program can include machine instructions that, when executed by CPU 14, cause transmitting station 12 to encode video data in the manner described in FIG. 3. Encoder 70 can also be implemented as specialized hardware included, for example, in transmitting station 12. Encoder 70 has the following stages to perform the various functions in a forward path (shown by the solid connection lines) to produce an encoded or a compressed bitstream 88 using input video stream 50: an intra/inter prediction stage 72, a transform stage 74, a quantization stage 76, and an entropy encoding stage 78. Encoder 70 may also include a reconstruction path (shown by the dotted connection lines) to reconstruct a frame for prediction and encoding of future blocks. In FIG. 3, encoder 70 has the following stages to perform the various functions in the reconstruction path: a dequantization stage 80, an inverse transform stage 82, a reconstruction stage 84, and a loop filtering stage 86. Other structural variations of encoder 70 can be used to encode video stream 50.

When video stream 50 is presented for encoding, each frame 56 within video stream 50 is processed in units of blocks. At intra/inter prediction stage 72, each block can be encoded using either intra-frame prediction (within a single frame) or inter-frame prediction (from frame to frame). In either case, a prediction block can be formed. In the case of intra-prediction, a prediction block can be formed from samples in the current frame that have been previously encoded and reconstructed. In the case of inter-prediction, a prediction block can be formed from samples in one or more previously constructed reference frames.

Next, still referring to FIG. 3, the prediction block can be subtracted from the current block at intra/inter prediction stage 72 to produce a residual block (residual). Transform stage 74 transforms the residual into transform coefficients in, for example, the frequency domain. Examples of block-based transforms include the Karhunen-Loève Transform (KLT), the Discrete Cosine Transform (DCT), the Singular Value Decomposition Transform (SVD) and the Asymmetric Discrete Sine Transform (ADST). In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix.

Quantization stage 76 converts the transform coefficients into discrete quantum values, which are referred to as quantized transform coefficients. The quantized transform coefficients are then entropy encoded by entropy encoding stage 78. The entropy-encoded coefficients, together with other information used to decode the block, which may include for example the type of prediction used, motion vectors and quantizer value, are then output to compressed bitstream 88. Compressed bitstream 88 can be formatted using various techniques, such as variable length encoding (VLC) and arithmetic coding. Compressed bitstream 88 can also be referred to as an encoded video stream and the terms will be used interchangeably herein.

The reconstruction path in FIG. 3 (shown by the dotted connection lines) can be used to ensure that both encoder 70 and a decoder 100 (described below) use the same reference frames to decode compressed bitstream 88. The reconstruction path performs functions that are similar to functions that take place during the decoding process that are discussed in more detail below, including dequantizing the quantized transform coefficients at dequantization stage 80 and inverse transforming the dequantized transform coefficients at inverse transform stage 82 to produce a derivative residual block (derivative residual). At reconstruction stage 84, the prediction block that was predicted at intra/inter prediction stage 72 can be added to the derivative residual to create a reconstructed block. Loop filtering stage 86 can be applied to the reconstructed block to reduce distortion such as blocking artifacts.

Other variations of encoder 70 can be used to encode compressed bitstream 88. For example, a non-transform based encoder 70 can quantize the residual signal directly without transform stage 74. In another implementation, encoder 70 can have quantization stage 76 and dequantization stage 80 combined into a single stage.

Figure 4:
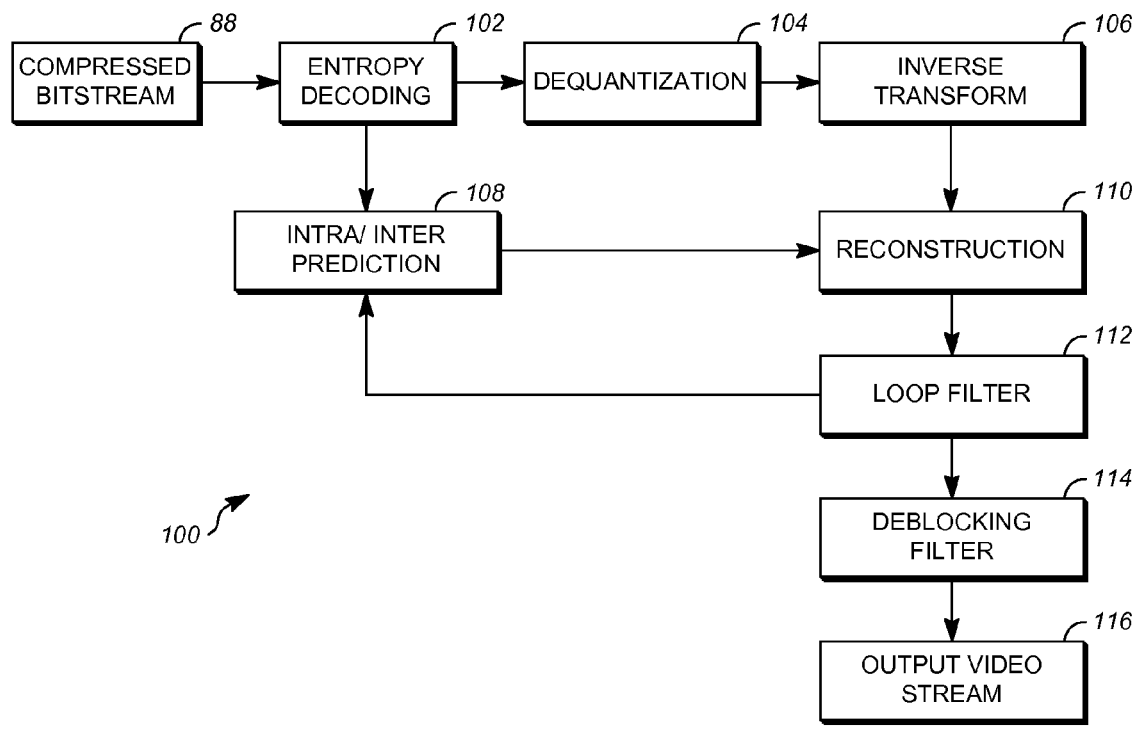
FIG. 4 is a block diagram of a video decoder in accordance with another implementation.

FIG. 4 is a block diagram of a video decoder 100 in accordance with another implementation of this disclosure. Decoder 100 can be implemented in receiving station 30, for example, by providing a computer software program stored in memory 34. The computer software program can include machine instructions that, when executed by CPU 32, cause receiving station 30 to decode video data in the manner described in FIG. 4. Decoder 100 can also be implemented as specialized hardware included, for example, in transmitting station 12 or receiving station 30.

Decoder 100, similar to the reconstruction path of encoder 70 discussed above, includes in one example the following stages to perform various functions to produce an output video stream 116 from compressed bitstream 88: an entropy decoding stage 102, a dequantization stage 104, an inverse transform stage 106, an intra/inter prediction stage 108, a reconstruction stage 110, a loop filtering stage 112 and a deblocking filtering stage 114. Other structural variations of decoder 100 can be used to decode compressed bitstream 88.

When compressed bitstream 88 is presented for decoding, the data elements within compressed bitstream 88 can be decoded by entropy decoding stage 102 to produce a set of quantized transform coefficients. Dequantization stage 104 dequantizes the quantized transform coefficients, and inverse transform stage 106 inverse transforms the dequantized transform coefficients to produce a derivative residual that can be identical to that created by inverse transform stage 82 in encoder 70. Using header information decoded from compressed bitstream 88, decoder 100 can use intra/inter prediction stage 108 to create the same prediction block as was created in encoder 70, e.g., at intra/inter prediction stage 72. At reconstruction stage 110, the prediction block can be added to the derivative residual to create a reconstructed block. Loop filtering stage 112 can be applied to the reconstructed block to reduce blocking artifacts. Deblocking filtering stage 114 can be applied to the reconstructed block to reduce blocking distortion, and the result is output as output video stream 116. Output video stream 116 can also be referred to as a decoded video stream and the terms will be used interchangeably herein.

Other variations of decoder 100 can be used to decode compressed bitstream 88. For example, decoder 100 can produce output video stream 116 without deblocking filtering stage 114.

Figure 5:
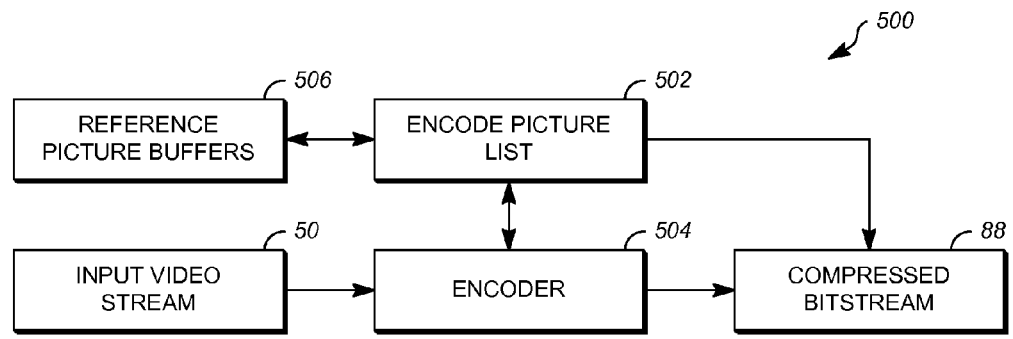
FIG. 5 is a block diagram of a modified video encoder illustrating management of a multi-reference picture buffer.

FIG. 5 is a block diagram of a modified video encoder 500 illustrating encoding of an input video stream using multiple reference pictures through a reference picture list in accordance with an implementation. Encoder 500 can be implemented as a software program using a computing device such as transmitting station 12, for example. The software program can be stored in memory 16 and can include instructions that, when executed by CPU 14, perform encoding steps described below. Encoder 500 can also be implemented as specialized hardware included, for example, in transmitting station 12. Encoder 500 has the following components to perform various functions to produce encoded or compressed bitstream 88 using input video stream 50: an encode picture list component 502, an encoder component 504 and reference picture buffers 506. Encoder component 504 performs processing as described for encoder 70 in FIG. 3 above, accepting as input a video stream 50 and outputting compressed bitstream 88. Encoder component 504 communicates with reference picture buffers 506 in cooperation with encode picture list component 502. Encoder component 504 can use the reference picture buffers 506 to temporarily store reference frames for use in inter-frame motion prediction using/at inter/intra prediction stage 72, for example.

Encode picture list component 502 manages reference picture buffers 506 and can keep track of which reference frames are currently being stored in which buffer in reference picture buffers 506, for example. Encode picture list component 502 assigns and encodes picture IDs and optionally encodes reference picture lists (e.g. lists of the reference picture IDs) to be included in encoded video stream 88. Details of assigning and encoding picture IDs are described below. Reference picture buffers 506 and encode picture list component 502 can also be incorporated into existing stages/components of encoder 70, such as in inter/intra prediction stage 72.

Figure 6:
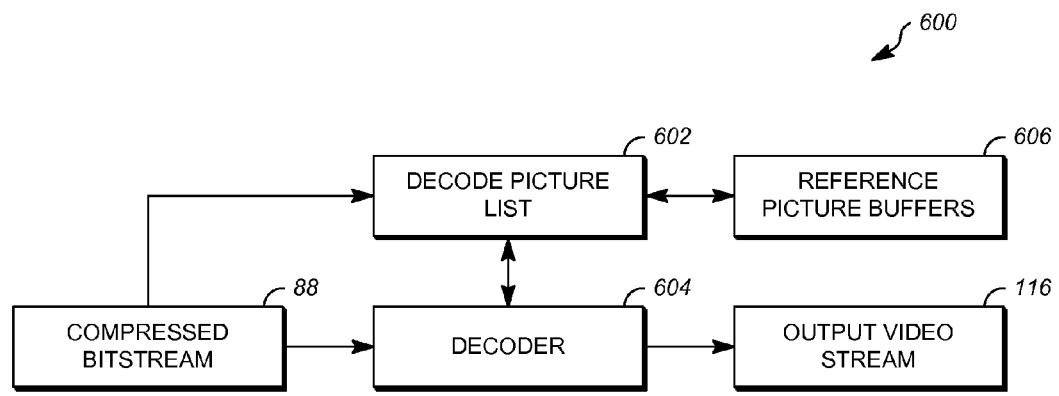
FIG. 6 is a block diagram of a modified video decoder illustrating management of a multi-reference picture buffer.

FIG. 6 is a block diagram of a modified video decoder 600 illustrating decoding of a compressed bitstream including picture IDs and in some instances a reference picture list in accordance with an implementation. Decoder 600 can be implemented as a software program using a computing device such as receiving station 30, for example. The software program can be stored in memory 34 and can include instructions that, when executed by CPU 32, perform decoding steps described below. Decoder 600 can also be implemented as specialized hardware included, for example, in receiving station 30. Decoder 600 has the following components to perform various functions to produce decoded or output video stream 116 from compressed bitstream 88: a decode picture list component 602, a decoder component 604 and reference picture buffers 606. Decoder component 604 performs processing as described for decoder 100 in FIG. 4 above, accepting as input encoded video stream 88 and outputting an output video stream 116. Decoder component 604 communicates with reference picture buffers 606 in cooperation with decode picture list component 602. Decoder component 604 can use reference picture buffers 606 to temporarily store reference frames for use in inter-frame motion prediction using/at inter/intra prediction stage 108, for example.

Decode picture list component 602 can manage the reference picture buffers 606 and keep track of which reference frames are currently being stored in which buffer in reference picture buffers 606, for example. Decode picture list component 602 decodes picture IDs and optionally reference picture lists included in encoded video stream 88. Reference picture buffers 606 and decode picture list component 602 can also be incorporated into existing stages/components of decoder 100, such as in inter/intra prediction stage 108.

Figure 7:
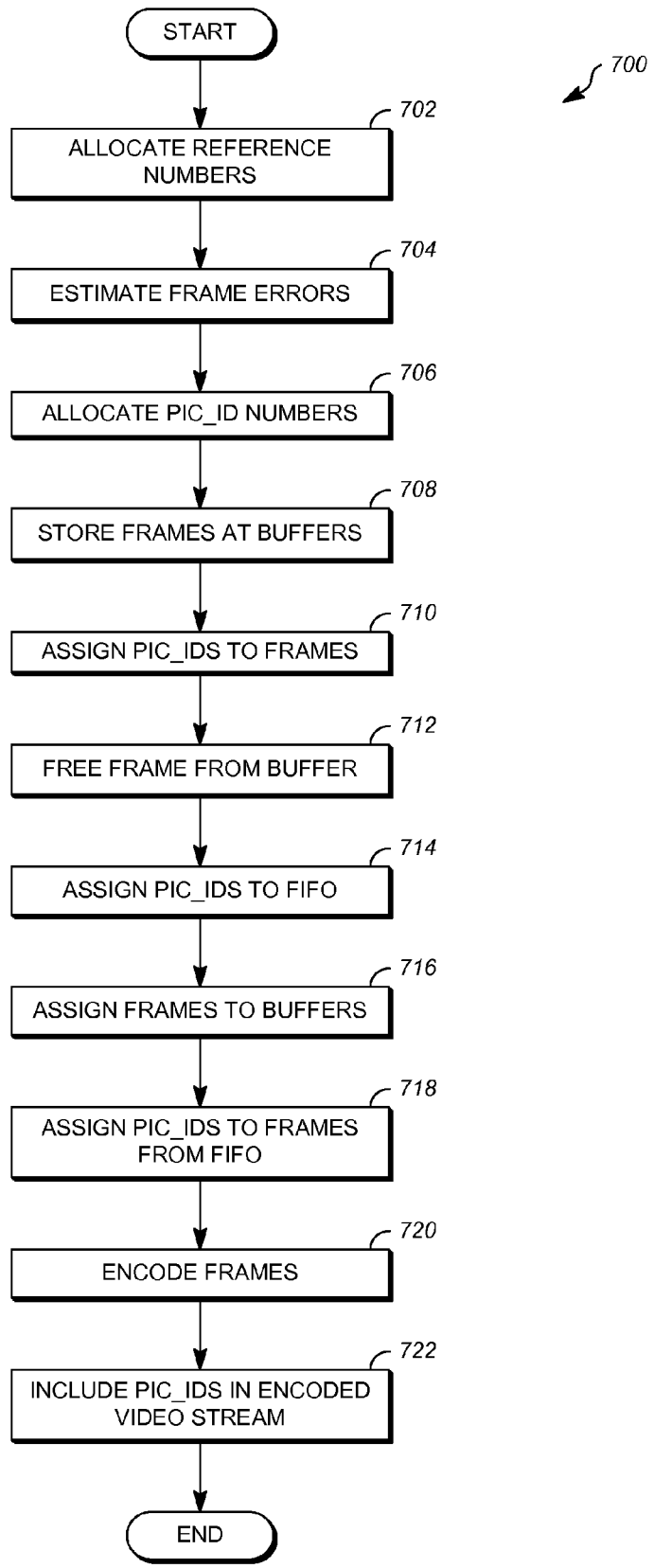
FIG. 7 is a flowchart diagram illustrating a process of managing a multi-reference picture buffer and encoding reference pictures in an encoded video stream in accordance with an implementation.

FIG. 7 is a flowchart diagram illustrating a process 700 of managing a multi-reference picture buffer and encoding reference pictures in an encoded video stream in accordance with an implementation. Process 700 can be implemented as a software program associated with encoder 500 using a computing device such as transmitting station 12, for example. The software program can be stored in memory 16 and can include instructions that, when executed by CPU 14, perform encoding steps described below. Process 700 can also be implemented as specialized hardware included, for example, in transmitting station 12. Process 700 can be implemented by the steps described below; however, the order in which the steps are performed may differ in different implementations and certain steps may occur concurrently. Further, steps may also be omitted, combined or added in certain implementations.

Process 700 employs a dedicated picture ID or number pic_id as a unique identification for a frame, sequence, slice or segment used as a reference in the reference picture buffers. The picture number pic_id may be assigned to a sequence header, picture header, slice header, segment header or any synchronization point within the video stream. For ease of explanation, the video stream data used as a reference and assigned a pic_id will be referred to as a frame. However, any defined portion of a video stream can be used.

At step 702, a number Nrb of reference picture buffers are allocated in memory of a computing device used for the encoding processes, for example reference picture buffers 506. The number Nrb of reference picture buffers to allocate can be predetermined to be compatible with the encoder used, for example. For example, the number Nrb of reference picture buffers can be a maximum number of reference buffers supported by encoder 500. The term "allocate" as used herein means to assign, apportion, designate, provide or in any manner whatsoever allocate memory locations for the stated use.

At step 704, an expected frame error length Mex is estimated. Mex can be considered as a margin added for error resiliency. Mex can represent, for example, the expected number of consecutive frames that can be lost due to transmission or storage errors. Estimation can be performed based on previously gathered statistics, analysis of current network conditions, a predetermined value or any combination of these. As used herein, the term "estimate" can mean approximate, project, measure or in any manner whatsoever estimate a value or values. Alternatively, Mex can simply be assigned a positive number.

At step 706, the picture numbers pic_id are allocated. When the pic_id is used only for identifying pictures and thus reference buffers, a picture can be assigned a pic_id value as long as the value is uniquely identifiable from other picture IDs in the reference buffer. When the number of reference picture buffers is Nrb, the pic_id value can range from 0 to PIDmax, where PIDmax is a maximum number of picture numbers pic_id. The maximum number PIDmax of picture numbers pic_id is equal to or larger than the number of reference buffers Nrb. Accordingly, the maximum number PIDmax of picture numbers pic_id can be the sum of the number of reference picture buffers and the margin Mex, minus 1 to account for a 0 value. This can be calculated according to the formula:

$$PIDmax = Nrb + Mex - 1.$$

Accordingly, the maximum number PIDmax is fixed at a relatively small finite number.

The value range or the word-length of the picture number pic_id can be defined or signaled in the mentioned headers or through other means. The value of pic_id can be coded in the bitstream with a fixed word-length code or variable length code. For example, the pic_id value can also be represented by a variable length code such as an Exp-Golomb code. The value of pic_id can be signed or unsigned. In an exemplary implementation described herein, the value of pic_id is unsigned (e.g. only represented by positive values). For example, with Nrb=6, Mex=10 and PIDmax=15, pic_id can assume values from 0 to 15 and can be represented by a 4-bit fixed-length code word. Note that the maximum value of pic_id can be, in certain implementations, larger than the number of reference buffers, e.g., for error robustness, so that a pic_id will not replicate within a period of certain pictures.

At step 708, reference pictures of the video stream can be stored at reference picture buffers, e.g., as needed. In this example, each reference picture is stored in a single buffer. Frames are stored temporarily in the reference picture buffer to permit encoding frames of the video stream using, for example, inter-frame motion prediction. Reference frames can be deleted from the reference picture buffer when they are no longer used to encode other frames in the video stream to make room for other reference frames.

At step 710, when a reference frame is encoded it will be assigned a picture number pic_id to be included in the picture header and possibly other headers such as a slice header, for example, for error resiliency. When this coded picture is to be stored in the reference picture buffer for future reference, the buffer at which the picture is stored will be marked with its picture number pic_id for identification purposes. As used herein the term "marked" can mean designated, signaled, indicated or otherwise marked in any manner whatsoever.

Before assigning a value of pic_id to reference frames and reference picture buffers, an array is created to represent the picture IDs of the number Nrb of allocated reference picture buffers. Where the array is referred to as pic_buffer_id[Nrb], it can be initialized as follows:

$$\text{pic\_buffer\_}id[i] = -1, \text{ for } i=0 \text{ to } Nrb-1.$$

Initializing in this way indicates that the ith buffer is "unused for reference" and is free to store other pictures. As reference frames are added to the reference picture buffer, the value in the pic_buffer_id array is set to the value of the pic_id assigned to the frame, so pic_buffer_id[i]=PID means that the ith buffer is occupied by a frame with pic_id=PID, where PID is in the range from 0 to PIDmax.

At step 712, as a reference frame is no longer used for encoding frames, that reference frame may be removed from the reference picture buffer. The pic_buffer_id[ ] entry for that reference picture buffer is set to −1 to indicate that the reference picture buffer is free. To keep track of which pic_id values are no longer in use in the reference picture buffer, a first-in-first-out buffer (PIDfifo[ ]) can be constructed and initialized as follows:

$PIDfifo[i]=-1$, for $i=0$ to $Mex-1$.

Accordingly, the size of array PIDfifo[ ] is Mex.

When the encoder starts, the first Nrb coded pic_ids can be assigned any value from 0 to PIDmax, as long as there is no replication. The first Nrb coded reference frames can be stored in the Nrb reference picture buffers. Each of these buffers will be assigned a pic_id corresponding to the pic_id of the reference frame stored at that buffer. For example, the first Nrb frames can be assigned pic_ids from 0 to Nrb-1, respectively.

For follow-on coded reference pictures, as new reference pictures are used, pic_ids can be assigned to the reference pictures from the unused pic_ids as they are stored in the reference picture buffers. As reference pictures are no longer used for prediction, the buffers they were assigned to are freed and their pic_ids are entered into the PIDfifo, e.g., at step 714, to free up one or more reference picture buffers. For example, the pic_id value for a reference picture buffer that is no longer used for prediction can be entered into the array PIDfifo[ ] until all of the unused pic_ids are assigned to the PIDfifo. At this point, all of the pic_ids have been used at least once. The array PIDfifo[ ] can be used to keep track of pic_id reuse to insure that the least recently used pic_id is assigned to a reference picture buffer to prevent confusion at the decoder in case of missing or corrupt frames or pic_ids.

At step 716, one or more frames to be used as reference pictures are assigned to reference picture buffers and any buffers having frames no longer used for prediction are freed by assigning a value of -1 to the reference picture buffer and entering the pic_id of the no longer used frame into the array PIDfifo[ ]. At step 718, a pic_id can be assigned to the reference pictures in the reference buffers from the array PIDfifo[ ] and the pic_id from the unused frame is entered into the array PIDfifo[ ] as follows:

$LastPIDfifo=PIDfifo[Mex-1]$;

$PIDfifo[i+1]=PIDfifo[i]$, for $i=0$ to $Mex-1$; and $PIDfifo[0]=PIDremoved$;

wherein LastPIDfifo is the least recently used pic_id to be assigned to the reference frame and the reference picture buffer or array pic_buffer_id[ ]; and PIDremoved is the pic_id of the frame that is no longer used for prediction and is most recently freed from the reference picture buffer.

As can be seen, the least recently used pic_id is shifted out of the PIDfifo[ ] at location Mex-1, each pic_id in the array PIDfifo is moved up one index, and the most recently freed value for pic_id is pushed onto the PIDfifo at index 0.

At step 718, a re-used pic_id can be selected for assignment to a reference frame and a reference picture buffer in which the reference frame is stored. If LastPIDfifo=-1, then the encoder can choose any PID value that is not the same as in the arrays of pic_buffer_id[ ] and PIDfifo[ ]. For example, the encoder may continue to increase the pic_id value by "1" (with a modulo operation with a wrap-around value at PIDmax) from the last picture ID. If LastPIDfifo does not equal-1, LastPIDfifo can be used as the value for pic_id for a reference frame and the associated reference buffer.

Following the above process, any picture may stay in the reference buffer perpetually without worrying about the possible conflict with the picture ID of the incoming pictures. Any picture ID that is removed from the reference buffer is not used within Mex number of coded pictures in this implementation.

At step 720, the frames are encoded by the encoder, and the pic_ids and optionally the pic_buffer_id[ ] array are encoded into the encoded video stream along with the frames for transmission or storage at step 722. The value of pic_id for each reference frame and the pic_buffer_id[ ] information are used to later decode the frames.

Figure 8:
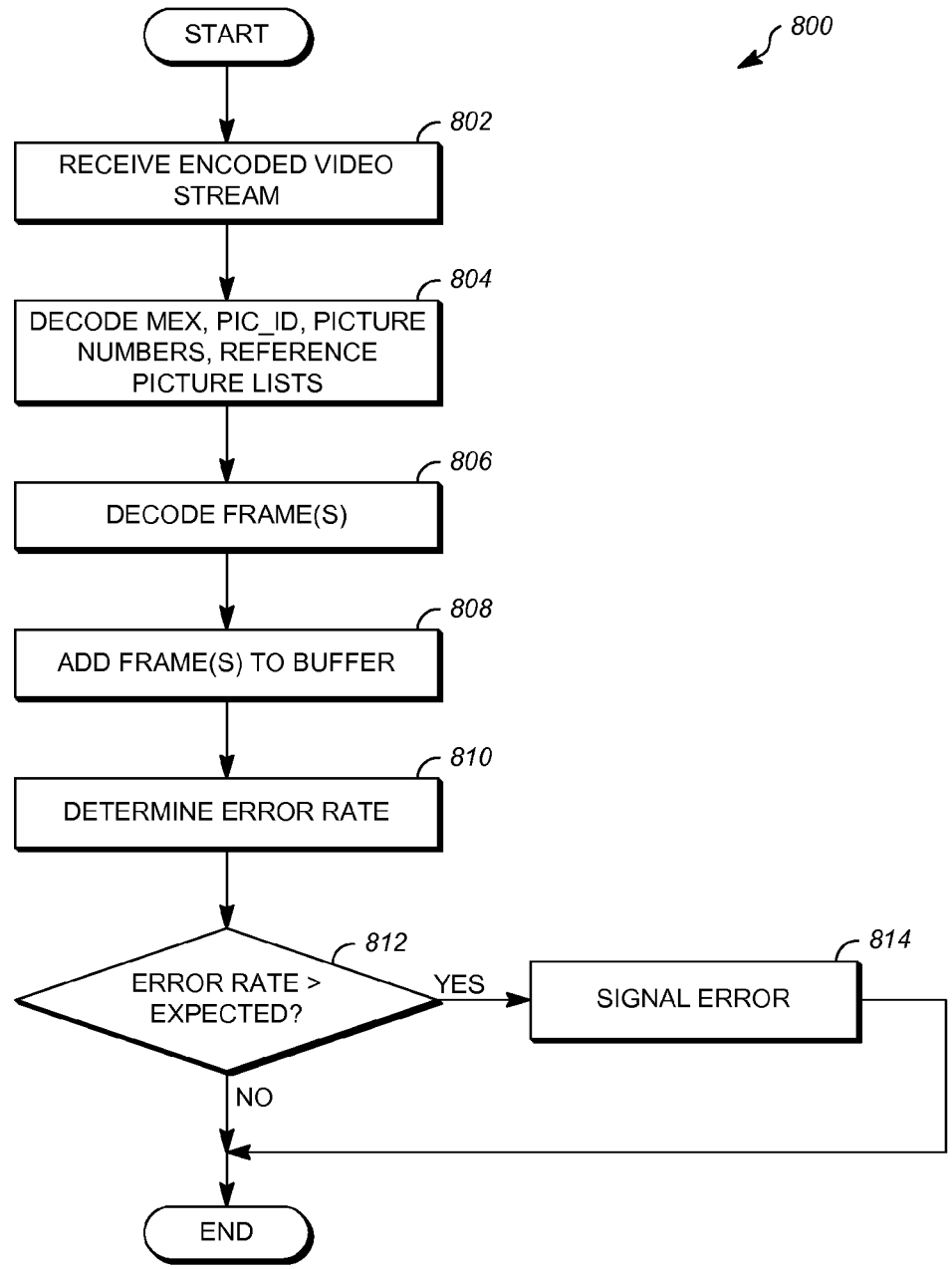
FIG. 8 is a flowchart diagram illustrating a process of decoding frames using a reference picture buffer in accordance with an implementation.

FIG. 8 is a flowchart diagram illustrating a process 800 of decoding frames using a reference picture buffer in accordance with an implementation. Process 800 can be implemented as a software program using a computing device such as receiving station 30, for example. The software program can be stored in memory 34 and can include instructions that, when executed by CPU 32, perform the decoding steps described below. Process 800 can also be implemented as specialized hardware included, for example, in receiving station 30. Process 800 can be implemented by the steps described below; however, the order in which the steps are performed may differ in different implementations and certain steps may occur concurrently. Further, steps may also be omitted, combined or added in certain implementations.

At step 802, an encoded video stream such as compressed bitstream 88 can be received at a computing device, for example receiving station 30. Herein, received means to read the data from a network that could be wired or wireless, from memory, or from a disk drive or removable media such as a CompactFlash (CF) card, Secure Digital (SD) card, or the like. Reference frames extracted from or generated by data from the video stream can be written to reference picture buffers 606 at decoder 600, for example, to be used to decode further frames.

At step 804, the decoder can decode Mex from the encoded video stream (e.g., compressed bitstream 88). The decoder can also decode in step 804 the picture numbers pic_ids and any reference picture lists included in the encoded video stream, e.g., in the picture header and/or other headers such as slice headers. The decoding process has been described generally above and can be the inverse of the encoding process at least in part.

At step 806, frames within the encoded video stream are decoded. This decoding includes decoding and/or generating one or more reference frames. At step 808, the reference frame is added to reference picture buffers of the decoder, such as buffers 606. In this description, each reference picture is assigned to its own buffer, so each buffer is assigned the pic_id of the frame stored therein. If a reference picture list is also included in the bitstream, the received reference picture list can be compared to a reference picture list generated at the decoder based on the received pic_ids to determine if a reference frame has been lost or corrupted, for example, by a transmission error or to determine if a reference frame buffer can be freed. Each decoder buffer may be marked "used for reference" or "unused for reference" based on the status of the reference picture within that buffer. This status can be received from the reference picture list referenced above or from other mechanisms that indicate the removal of a picture store in a reference buffer, e.g., Memory Management Control Operations (MMCOs). A decoded reference picture can be stored in any buffer that is marked as "unused for reference" or can be stored in other buffers through syntax elements.

At step 810, the error rate of the received video stream is determined. The error rate can be determined by checking for missing pic_ids as described above or from transport level information such as missing packets or Picture-Order-Count (POC) techniques, for example. At step 812, the determined error rate is compared to the received maximum expected error rate Mex. If the determined error rate is greater than the expected error rate, the number of missing frames may exceed the maximum number of missing frames that process 800 can handle without error. In this case, process 800 can take corrective action at step 814 by, for example, signaling the encoder that many frames have been lost in a row and the decoder buffers and encoder buffers have lost synchronization. The encoder may send an intra-frame to re-establish encoder-decoder buffer synchronization. The terms "signaling" or "sending" as used herein can mean indicating, communicating, signing or otherwise signaling in any manner whatsoever. Process 800 can repeat until all frames are decoded.

Accordingly, a maximum picture ID number can be calculated using a number of buffers or storage locations available to temporarily store reference frames plus an extra value based on the possible number of frames that could be lost or corrupted due to unreliable network transmission. Calculating a maximum picture ID number and re-using picture ID numbers can limit the number of bits required to code the picture IDs in the bitstream for buffer management purposes. Further, it is possible to keep track of which picture ID numbers are in use to designate which frames are assigned to which buffers. As reference frames are no longer in use in a buffer, the picture ID number designating the reference frame can be recycled for use by a subsequent reference frame. The unused picture ID numbers can be kept in a first-in-first-out (FIFO) buffer in order to enforce a least-recently-used policy for re-using picture ID numbers.

As described, if picture loss is no more than Mex number of pictures in a row, the good reference pictures in the decoder buffers can be confidently used for prediction. A good reference picture is defined as a picture's worth of intact bitstream with good references. If the bitstream is corrupted or lost, or if reference pictures to be used for decoding the bistream do not exist or are corrupted, the decoded picture may be considered a bad reference picture. The number of picture losses in a row may be determined by other means, such as through picture numbers, transport level information, etc.

The aspects and implementations of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Implementations of transmitting station 12 and/or receiving station 30 (and the algorithms, methods, instructions, etc. stored thereon and/or executed thereby, including by encoder 70 and decoder 100) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 12 and receiving station 30 do not necessarily have to be implemented in the same manner.

Further, in one embodiment, for example, transmitting station 12 or receiving station 30 can be implemented using a general purpose computer or general purpose processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Transmitting station 12 and receiving station 30 can, for example, be implemented on computers in a video conferencing system. Alternatively, transmitting station 12 can be implemented on a server and receiving station 30 can be implemented on a device separate from the server, such as a hand-held communications device. In this instance, transmitting station 12 can encode content using encoder 70 into an encoded video signal and transmit the encoded video signal to the communications device. In turn, the communications device can then decode the encoded video signal using decoder 100. Alternatively, the communications device can decode content stored locally on the communications device, for example, content that was not transmitted by transmitting station 12. Other suitable transmitting station 12 and receiving station 30 implementation schemes are available. For example, receiving station 30 can be a generally stationary personal computer rather than a portable communications device and/or a device including encoder 70 may also include decoder 100.

Further, all or a portion of embodiments of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video stream having a plurality of frames, comprising:
   identifying an allocated number of reference frame buffers;
   calculating a maximum number of picture IDs as equal to or greater than the allocated number;
   assigning, using a processor, a picture ID to a respective reference frame assigned to a respective reference frame buffer of a plurality of reference frame buffers to no higher than the maximum number of picture IDs, each picture ID having a value not assigned to any other reference frames assigned to the plurality of reference frame buffers;
   freeing the picture ID when its associated reference frame is no longer assigned to the reference frame buffer;
   re-using a freed picture ID when assigning the picture IDs such that the freed picture ID is not re-used within a number of encoded frames that is equal to the maximum number of picture IDs;
   encoding one or more frames of the plurality of frames using the reference frames assigned to the plurality of reference frame buffers; and
   including the picture IDs in the video stream.

2. The method of claim 1 wherein re-using the freed picture ID when assigning the picture IDs comprises assigning a least recently used picture ID for a new reference frame assigned to one of the plurality of reference frame buffers.

3. The method of claim 1 wherein assigning a least recently used picture ID is performed using a first-in-first-out array having an array size equal to the maximum number of picture IDs.

4. A method for encoding a video stream having a plurality of frames, comprising:
   identifying an allocated number of reference frame buffers;
   calculating a maximum number of picture IDs as equal to or greater than the allocated number;
   estimating an expected error value representing possible frame errors; wherein the maximum number of picture IDs is equal to the allocated number plus the expected error value;
   assigning, using a processor, a picture ID to a respective reference frame assigned to a respective reference frame buffer of a plurality of reference frame buffers to no higher than the maximum number of picture IDs, each picture ID having a value not assigned to any other reference frames assigned to the plurality of reference frame buffers;
   freeing the picture ID when its associated reference frame is no longer assigned to the reference frame buffer;
   periodically re-using a freed picture ID when assigning the picture IDs;
   encoding one or more frames of the plurality of frames using the reference frames assigned to the plurality of reference frame buffers; and
   including the picture IDs in the video stream.

5. The method of claim 1, further comprising:
   encoding one or more frames of the plurality of frames using the reference frames assigned to the plurality of reference frame buffers to perform motion prediction.

6. The method of claim 1 wherein including the picture IDs in the video stream further comprises:
   encoding the picture ID in a sequence header, picture header, slice header or segment header.

7. An apparatus for encoding a video stream having a plurality of frames, comprising:
   a memory;
   a processor configured to execute instructions stored in the memory to:
   identify an allocated number of reference frame buffers;
   calculate a maximum number of picture IDs as greater than the allocated number;
   assign a picture ID to a respective reference frame assigned to a respective reference frame buffer of a plurality of reference frame buffers to no higher than the maximum number of picture IDs, each picture ID having a value not assigned to any other reference frames assigned to the plurality of reference frame buffers;
   free the picture ID when its associated reference frame is no longer assigned to the reference frame buffer;
   re-use a freed picture ID when assigning the picture IDs;
   encode one or more frames of the plurality of frames using the reference frames assigned to the plurality of reference frame buffers; and
   include the picture IDs in the video stream.

8. The apparatus of claim 7 wherein the processor is configured to re-use the freed picture ID when assigning the picture IDs by assigning a least recently used picture ID for a new reference frame assigned to one of the plurality of reference frame buffers.

9. The apparatus of claim 7 wherein the processor is configured to assign a least recently used picture ID using a first-in-first-out array.

10. The apparatus of claim 7 wherein the processor is configured to:
    estimate an expected error value representing possible frame errors; and wherein the maximum number of picture IDs is equal to the allocated number plus the expected error value.

11. The apparatus of claim 7 wherein the processor is configured to:
    encode one or more frames of the plurality of frames using the reference frames assigned to the plurality of reference frame buffers to perform motion prediction.

12. The apparatus of claim 7 wherein the processor is configured to include the picture IDs in the video stream by:
    encoding the picture ID in a sequence header, picture header, slice header or segment header.

13. The apparatus of claim 7 wherein the processor is configured to free the picture ID by assigning it to a first-in-first-out array having a size equal to the maximum number of picture IDs; and wherein the processor is configured to re-use a freed picture ID by selecting a next available picture ID from the first-in-first-out array.

14. The apparatus of claim 7 wherein the processor is configured to re-use a freed picture ID only after a number of frames that is equal to the maximum number of picture IDs is encoded.

15. The apparatus of claim 7 wherein the maximum number of picture IDs is equal to the allocated number plus a positive value.

16. The apparatus of claim 15 wherein the positive value is equal to an expected error value representing possible frame errors.

17. The method of claim 1 wherein the maximum number of picture IDs is equal to the allocated number plus a positive value such that the maximum number of picture IDs is greater than the allocated number.

18. The method of claim 7 wherein the positive value is equal to an expected error value representing possible frame errors.

19. The method of claim 1, further comprising:
assigning the picture ID to a first-in-first-out array having a size equal to the maximum number of picture IDs after freeing the picture ID; and
re-using a freed picture ID by selecting a next available picture ID from the first-in-first-out array.

\* \* \* \* \*